US006356396B1

(12) United States Patent
Chen et al.

(10) Patent No.: US 6,356,396 B1
(45) Date of Patent: Mar. 12, 2002

(54) OPTICAL SYSTEM HAVING A GENERALIZED TORUS OPTICAL CORRECTOR

(75) Inventors: Chungte W. Chen, Irvine; Stephen C. Fry, Hermosa Beach; J. Steve Anderson, Santa Monica, all of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/496,143

(22) Filed: Feb. 1, 2000

(51) Int. Cl.[7] .................. G02B 13/18; G02B 27/22; G02B 13/06; G02B 7/02
(52) U.S. Cl. .................. 359/711; 359/642; 359/479; 359/725; 359/637; 359/554; 359/815; 359/753; 244/3.17
(58) Field of Search .................. 359/642, 725, 359/712, 637, 635, 815, 823, 479, 506, 554, 894, 511, 749, 750, 728; 244/3.17, 3.1, 3.15, 3.23; 250/201.3, 203.1, 203.6, 236

(56) References Cited

U.S. PATENT DOCUMENTS

| | | | | |
|---|---|---|---|---|
| 4,010,365 A | * | 3/1977 | Meyer et al. | 350/236 |
| 4,019,804 A | * | 4/1977 | Collier | 359/216 |
| 4,123,134 A | * | 10/1978 | Meyers | 359/216 |
| 4,705,343 A | * | 11/1987 | Simons | 359/354 |
| 5,042,914 A | * | 8/1991 | Hulderman et al. | 359/824 |
| 5,285,461 A | * | 2/1994 | Krasutsky et al. | 250/234 |
| 5,526,181 A | * | 6/1996 | Kunick et al. | 359/613 |
| 6,028,712 A | * | 2/2000 | McKinney et al. | 359/642 |
| 6,180,938 B1 | * | 1/2001 | Crowther et al. | 250/216 |

* cited by examiner

*Primary Examiner*—Georgia Epps
*Assistant Examiner*—Evelyn A. Lester
(74) *Attorney, Agent, or Firm*—Colin M. Raufer; Leonard A. Alkov; Glenn H. Lenzen, Jr.

(57) ABSTRACT

An optical system includes a window, an optical corrector formed of a curved piece of a transparent material having a front surface and a back surface, and a sensor system with a sensor positioned such that the optical corrector is between the window and the sensor. At least one of the front surface and the back surface of the optical corrector is a segment of a convex aspheric curve rotated about a center, otherwise known as a torus.

20 Claims, 3 Drawing Sheets

OPTICAL SYSTEM HAVING A GENERALIZED TORUS OPTICAL CORRECTOR

This invention was made with Government support under Contract No. MDA972-96-C-0800 awarded by the Government. The Government has certain rights in this invention.

BACKGROUND OF THE INVENTION

This invention relates to optical systems, and in particular to optical systems used in relation to conformal windows in aircraft sensor systems.

An optical sensor receives radiated energy from a scene and converts it to an electrical signal. The electrical signal is provided to a display or further processed for pattern recognition or the like. Optical sensors are available in a variety of types and for wavelengths ranging from the ultraviolet, through the visible, and into the infrared. Optical sensors are used in both commercial and military applications. In some applications the optical sensor is fixed in orientation, and in others the optical sensor is movable such as by a pivoting motion or a pivoting and rolling motion to allow sensing over a wide angular range.

The optical sensors generally employ a photosensitive material that faces the scene and produces an electrical output responsive to the incident energy. The photosensitive material and remainder of the sensor structure are rather fragile, and are easily damaged by dirt, erosion, chemicals, or high wind velocity. The sensor is placed behind a window through which it views the scene and which protects the sensor from such external effects. The window must be transparent to the radiation of the operating wavelength of the sensor and resist attack from the external forces. The window must also permit the sensor to view the scene over the specified field of regard. This field of regard is the angular extent over which the sensor must be able to be pointed to view the scene. The field of regard may extend over wide angles and in two rotational directions. For example, a look-down sensor on a high-speed aircraft must have a field of regard that extends over large specified angles from front-to-back (elevational angle) and from side-to-side (azimuthal angle).

The window would ideally introduce minimal wavefront distortion of the scene over the field of regard of the sensor, particularly if the sensor is an imaging sensor. The larger and thicker the window, the more likely is the introduction of significant wavefront distortion. Where there is wavefront distortion, as is always the case to some degree, it is desirable that such wavefront distortion be of a predictable, regular type that may be compensated for, at least in part, with an optical corrector placed between the window and the sensor or by electrical circuitry or processing.

A wide variety of sensor windows have been used in various aircraft applications. In many cases such as low-speed helicopters, flat windows are acceptable. Windows that are shaped as segments of spheres or conic sections are used in aircraft (including missile) applications, but for these windows the radar signature and the aerodynamic drag of the window are large.

For applications involving aircraft (including missiles) operating at high speeds, the window should be relatively aerodynamic such that the presence of the window extending into the airstream does not introduce unacceptably high and/or asymmetric aerodynamic drag to the vehicle. A conformal window of this type typically has a ratio of the length of the window to the diameter of the window, termed the "fineness ratio" in the art, of greater than about 0.5. A conformal window is beneficial to reducing drag and increasing the range of the aircraft. However, existing conformal windows introduce large wavefront distortions into the sensor beam, particularly for high azimuthal pointing angles of the sensor.

It is known to form the window with a torus shape that provides a compromise between good aerodynamic properties and minimal wavefront distortion. This approach, described in U.S. Pat. No. 5,914,821, is effective for a number of applications. In other applications, even better aerodynamic performance in terms of extended range and speed is required than possible with this approach.

There is a need for an improved optical system to be used in demanding applications such as look-down and side-looking windows in high-speed aircraft. The present invention fulfills this need, and further provides related advantages.

SUMMARY OF THE INVENTION

The present invention provides an optical system that is suitable for use in high-speed aircraft. The optical system includes a window, a sensor, and an optical corrector positioned between the sensor and the window. The window is conformal and introduces minimal drag in the airflow, improving the range and speed of the aircraft. The optical corrector corrects wavefront distortion introduced into the optical path of the sensor by the window. The optical corrector may be made relatively light in weight. The sensor may be sensitive to any of a wide variety of types and wavelengths of energy.

In accordance with the invention, an optical system comprises a window, and an optical corrector comprising a curved piece of a transparent material having a front surface and a back surface. At least one of the front surface and the back surface of the optical corrector has a torus shape defined in Cartesian coordinates by the relation $$Z(x,y)=Z_{prev}(x,y)+L_x(x,y)+L_y(y).$$

In this relation, $$Z_{prev}(x,y)=c_A\rho^2/[1+(1-(k_A+1)c_A^2\rho^2)^{1/2}]+d_A\rho^4+e_A\rho^6+f_A\rho^8+g_A\rho^{10},$$

$$\rho^2=x^2+y^2,$$

$$L_y(y)=C_1y^2/[1+(1-(C_2+1)C_1^2y^2)^{1/2}]+C_3y^4+C_4y^6+C_5y^8+C_6y^{10}+C_7y^{12}+C_8y^{14},$$

$$L_x(x,y)=C_xx^2/[1+(1-(k_x+1)C_x^2x^2)^{1/2}]+C_{13}x^4+C_{14}x^6+C_{15}x^8+C_{16}x^{10}+C_{17}x^{12}+C_{18}x^{14},$$

$$C_x=C_{11}+C_{21}y+C_{31}y^2,$$

and $$k_x=C_{12}+C_{22}y+C_{32}y^2.$$

wherein $c_A$, $k_A$, $d_A$, $e_A$, $f_A$, $g_A$, $C_1$–$C_8$, $C_{11}$–$C_{18}$, $C_{21}$–$C_{22}$, and $C_{31}$–$C_{32}$ are constants. A sensor system, comprising a sensor, is positioned such that the optical corrector is between the window and the sensor.

Here, $Z_{prev}(x,y)$ is a generalized aspheric shape of the typical optical surface. $L_y(y)$ is the parent profile of the torus shape. $L_x(x,y)$ is the profile parallel to the x-z plane sweeping along the parent profile. $C_x$ and $C_1$ are the curvatures of the profiles $L_x(x,y)$ and $L_y(y)$, respectively.

The values of $c_A$, $k_A$, $d_A$, $e_A$, $f_A$, $g_A$, $C_1$–$C_8$, $C_{11}$–$C_{18}$, $C_{21}$–$C_{22}$, and $C_{31}$–$C_{32}$ are constants for any selected optical corrector and define the shape of the optical corrector at any selected location (x, y, z) according to the relations set forth above. The coefficients $C_3$–$C_8$ and $C_{13}$–$C_{18}$ are higher order coefficients similar to a typical aspheric surface shape described by $Z_{prev}(x,y)$. These coefficients modify the basic surface shape slightly to obtain better wavefront uniformity. There are no known limitations on the values over which the constants may range, except as noted.

The optical system of the invention allows the window to be optimally shaped for aerodynamic performance. The wavefront distortion which the window introduces into the optical path is corrected with the optimally shaped optical corrector. This combination permits the aircraft designer to optimize the window to achieve the best aerodynamic performance and to independently optimize the optical corrector to achieve the required optical performance to produce good-quality images. By contrast, where the window has a particular curvature to minimize wavefront distortion, as in some prior approaches, either the aerodynamic performance or the optical performance is compromised to some degree. That compromise in performance is not experienced in the approach of the invention.

The optical corrector desirably eliminates wavefront distortion over a wide field of regard, but any residual wavefront distortion may be further reduced or removed by electronic signal processing.

In many instances, the window preferably is an aerodynamic conformal window with a fineness ratio of greater than about 0.5. In one embodiment, the window has an outer surface with a first ellipsoidal shape, and an inner surface with a second ellipsoidal shape.

The optical corrector is preferably in the form of a curved strip of transparent material mounted in the view path of the sensor. This strip form of optical corrector is usually mounted on a gimbal structure, such as a roll gimbal. The optical corrector thus comprises a curved strip of a transparent material having a front surface and a back surface, with at least one of the front surface and the back surface having a shape which is a segment of a torus shape. The strip form of the optical corrector subtends an azimuthal arc as large as necessary to cover the azimuthal field of regard required for the sensor system, typically on the order of about 40 degrees. The strip optical corrector may be relatively narrow in angular extent, usually less than about 10 degrees and typically about 3 degrees, in the orthogonal direction, as it is rotated on the roll gimbal to achieve 360 degrees of coverage about its centerline.

The sensor may be of any operable type. It may be sensitive to radiation in the ultraviolet, visible, or infrared ranges, or to specific bands within these ranges. Such sensors are known in the art. The window and optical corrector are transparent to the same wavelength as is sensed by the sensor. The sensor system, which usually includes a telescope that directs the optical beam into the sensor, is typically mounted on a gimbal such as a roll/nod gimbal.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
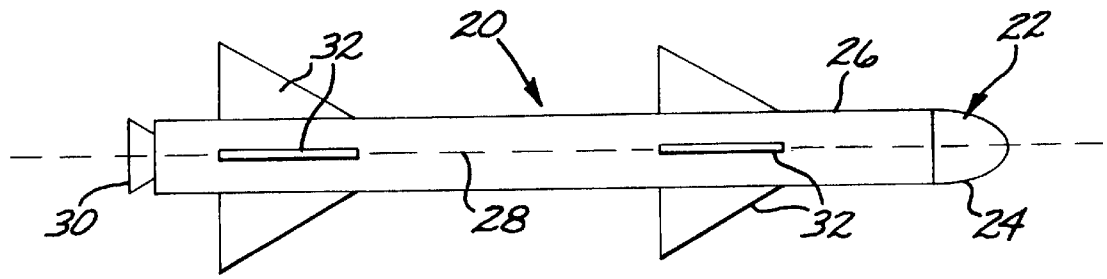
FIG. 1 is a side elevational view of a missile with a forward-facing optical system.

FIG. 1 depicts an aircraft, in this case an unmanned missile 20, utilizing an optical system 22 according to the invention. The optical system 22 includes a forwardly facing dome-shaped window 24 mounted to a body 26 of the missile 20 along its centerline 28. The missile 20 includes other components common to missiles, such as a propulsion system 30 and control surfaces 32. Within the missile 20 and not visible in the drawing are the control system, communications system (if any), and payload. The present invention is concerned with the optical system 22, and is operable with any known type of missile 20 and with advanced missiles to be developed. The optical system of the present invention is most preferably applied in relation to a missile, but it may be used with manned aircraft and in other applications as well.

Figure 2:
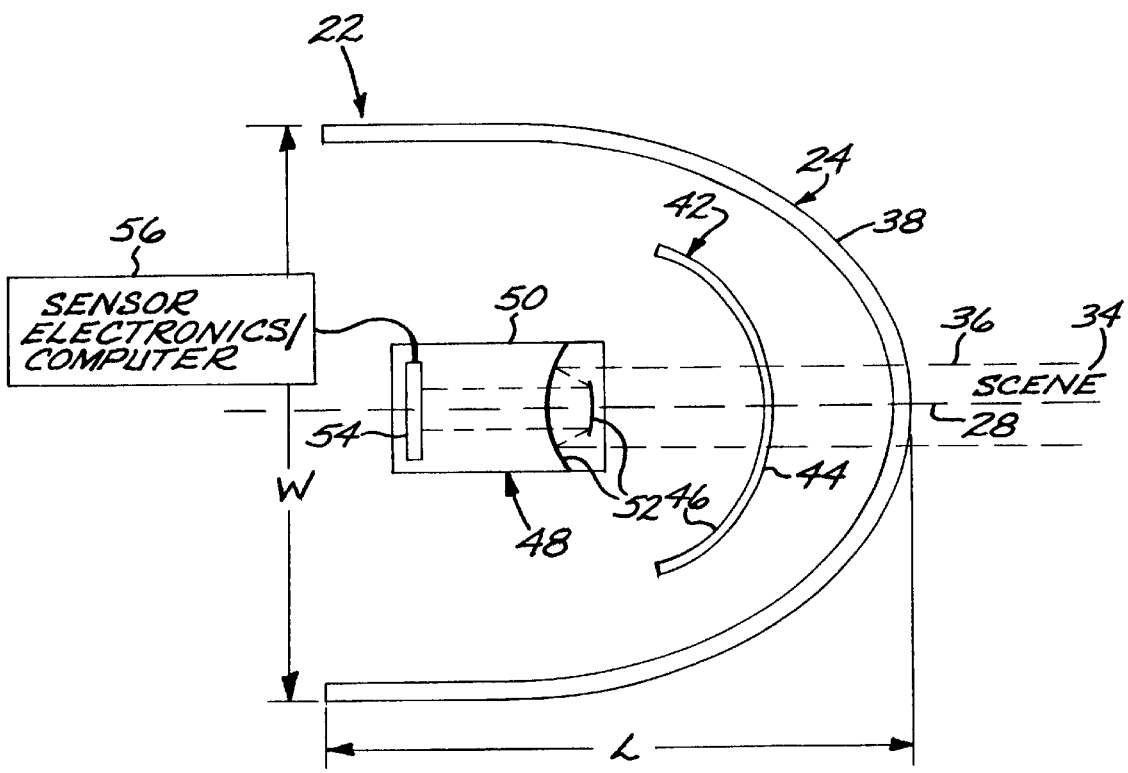
FIG. 2 is a schematic view of an optical system according to the invention.

FIG. 2 is a schematic depiction of the optical system 22. Radiation from a scene 34 passes along an optical path 36 and through the window 24.

The window 24 has an outer (outwardly facing) surface 38 and an inner (inwardly facing) surface 40. The window 24 preferably has a ratio L/W (termed in the art the "fineness ratio") of its length L parallel to the centerline 28 to its width W perpendicular to the centerline 28 of more than about 0.5. It is preferred that at least one, and preferably both, of the outer surface 38 and the inner surface 40 of the window 24 has a generalized conic shape described by the relation:

$$Z = c\rho^2/[1+(1-(k+1)c^2\rho^2)^{1/2}] + d\rho^4 + e\rho^6 + f\rho^8 + g\rho^{10},$$

where $$\rho^2 = x^2 + y^2,$$

and wherein c(vertex curvature), k(conic constant), d, e, f, and g are constants. (If d, e, f, and g are all zero, the surface is a conic section of revolution.) The window 24 has several other requirements. It must physically protect the remainder of the optical system 22. It must allow the sensor system an angular viewing range, the field of regard. It must be transparent to the radiation wavelength of interest so that it passes a high fraction of the incident radiation to the sensor with acceptably low wavefront distortion.

The radiation on the optical path 36 passes through an optical corrector 42, which has a front (forwardly facing) surface 44 and a back (rearwardly facing) surface 46. According to the present approach, the window has a torus form, and more specifically is a segment of a torus. Two examples of simple forms of a torus are a section of a donut and a section of a tire tube.

In precise mathematical terms, the shapes of the front surface 44 and/or back surface 46 of the optical corrector 42 are defined in Cartesian coordinates as $$Z(x,y)=Z_{prev}(x,y)+L_x(x,y)+L_y(y).$$

In this relation, $$Z_{prev}(x,y)=c_A\rho^2/[1+(1-(k_A+1)c_A^2\rho^2)^{1/2}]+d_A\rho^4+e_A\rho^6+f_A\rho^8+g_A\rho^{10},$$

$$\rho^2=x^2+y^2,$$

$$L_y(y)=C_1y^2/[1+(1-(C_2+1)C_1^2y^2)^{1/2}]+C_3y^4+C_4y^6+C_5y^8+C_6y^{10}+C_7y^{12}+C_8y^{14},$$

$$L_x(x,y)=C_xx^2/[1+(1-(k_x+1)C_x^2x^2)^{1/2}]+C_{13}x^4+C_{14}x^6+C_{15}x^8+C_{16}x^{10}+C_{17}x^{12}+C_{18}x^{14},$$

$$C_x=C_{11}+C_{21}y+C_{31}y^2,$$

and $$k_x=C_{12}+C_{22}y+C_{32}y^2.$$

Here, $Z_{prev}(x,y)$ is a generalized aspheric shape of the typical optical surface. $L_y(y)$ is the parent profile of the torus shape. $L_x(x,y)$ is the profile parallel to the x-z plane sweeping along the parent profile. $C_x$ and $C_y$ are the curvatures of the profiles $L_x(x,y)$ and $L_y(y)$, respectively. The preferred values of $k_x$ are $-\infty \leq k_x < 100$.

The values of $c_A$, $k_A$, $d_A$, $e_A$, $f_A$, $g_A$, $C_1$–$C_8$, $C_{11}$–$C_{18}$, $C_{21}$–$C_{22}$, and $C_{31}$–$C_{32}$ are constants for any selected optical corrector and define the shape of the optical corrector at any selected location (x,y) according to the relations set forth above. The coefficients $C_3$–$C_8$ and $C_{13}$–$C_{18}$ are higher order coefficients similar to a typical aspheric surface shape described by $Z_{prev}(x,y)$. These coefficients modify the basic surface shape slightly to obtain better wavefront uniformity. There are no known limitations on the values over which the constants may range.

With the present approach, the shape of the outer surface 38 of the window 24 is selected for its aerodynamic performance. The shape of the inner surface 40 and the thickness of the window 24 are selected to provide the structural strength required in the window and to reduce as much as possible the wavefront distortion that results when the image is viewed through the window. However, the inner surface 40 typically cannot be selected to remove all of the wavefront distortion, consistent with aerodynamic and structural performance. The shapes of the front surface 44 and the back surface 46 of the optical corrector 42 are selected to minimize the wavefront distortion of the image when viewed through the window and the optical corrector. The shapes of the front surface 44 and the back surface 46 are determined by spline fitting the values of the constants in the equations set forth above, to achieve the desired optical correction as determined by ray tracing.

In a presently preferred form, the following values in the above-stated relations were selected for the shapes of the window 24 and of the optical corrector 42. The window 24 is made of magnesium fluoride with a refractive index of 1.3491910.

For the outer surface 38 of the window 24: c=1.5640494, k=−0.77674000, d=0.0894160, e=0.1516900, f=−0.0806940, g=0.

For the inner surface 40 of the window 24: c=1.7180743, k=−0.7873700, d=0.1388900, e=0.1866300, f=−0.0950620 g=0.

The optical corrector 42 is made of zinc sulfide with a refractive index of 2.2504340.

For the front surface 44 of the optical corrector 42: $c_A$, $k_A$, $d_A$, $e_A$, $f_A$, and $g_A$ are all 0, $C_1$=1.0673900, $C_2$=−0.4258450, $C_3$=0.0671804, $C_4$=0.0423496, $C_5$=0.0156742, $C_{11}$=0.1418990, $C_{12}$=−16.2801000, $C_{13}$=−0.1609050, $C_{14}$=0.3242460, $C_{15}$=310.0690083, $C_{31}$=0.2149120, $C_{32}$=−7.4736900, all other values zero.

For the back surface 46 of the optical corrector 42: $c_A$=0, $k_A$=0, $d_A$= 0.0520080, $e_A$=−0.0113990, $f_A$=0, $g_A$=0, $C_1$=1.1274300, $C_2$=−0.4267620, $C_3$ =0.0274227, $C_4$=0.0725477, $C_5$=0.0078448, $C_{11}$=0.0990996, $C_{12}$=−343.239000, $C_{13}$=−0.1823680, $C_{14}$=0.2886500, $C_{15}$=−0.0299068, $C_{31}$=0.0158505, $C_{32}$=−103.427000, all other values zero.

The torus-shaped optical corrector 42 of the invention has important practical advantages. It has low distortion over a wide field of regard. Most importantly, the residual wavefront distortion of the torus optical corrector is in the nature of lower-order aberrations, such as focus, astigmatism, and coma. The torus optical corrector 42 is relatively small.

The radiation from the scene 34 traveling along the optical path 36 enters a sensor system 48 that includes a telescope 50, where it is reflected and/or refracted by mirrors and/or lenses, represented generally here by a reflective mirror set 52. The telescope optical elements are selected to provide a desired directing, focusing, magnifying, and shaping of the radiation on the optical path 36, according to principles known in the art. The mirror and/or lens optical elements of the telescope may have an intentionally introduced telescope bias aberration to compensate the bias aberration of the optical corrector and of the window. The sensor system 48 further includes a sensor 54, such as an illustrated focal plane array (FPA) sensor used for imaging the scene 34. The structure of the sensor 54 may be selected to be sensitive to various types of radiation, such as ultraviolet, visible, or infrared, or specific bands within these ranges, accordingly to principles well known in the art. The output of the sensor 54 is an electrical signal that is provided to electronics in the form of sensor electronics and computer 56, a display (not illustrated), or other output or processing device. The computer may be used to digitally reduce distortion as a function of angular position of the viewed scene and to process the information of the image, according to principles known in the art.

Figure 3:
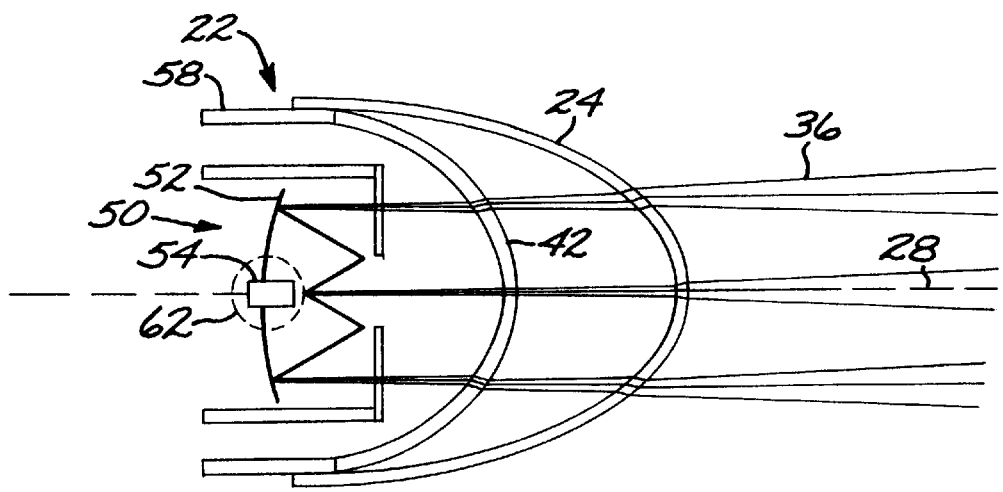
FIG. 3 is a schematic side elevational view of the physical elements of the optical system used in the missile of FIG. 1, with the sensor system pointed along the centerline.
Figure 4:
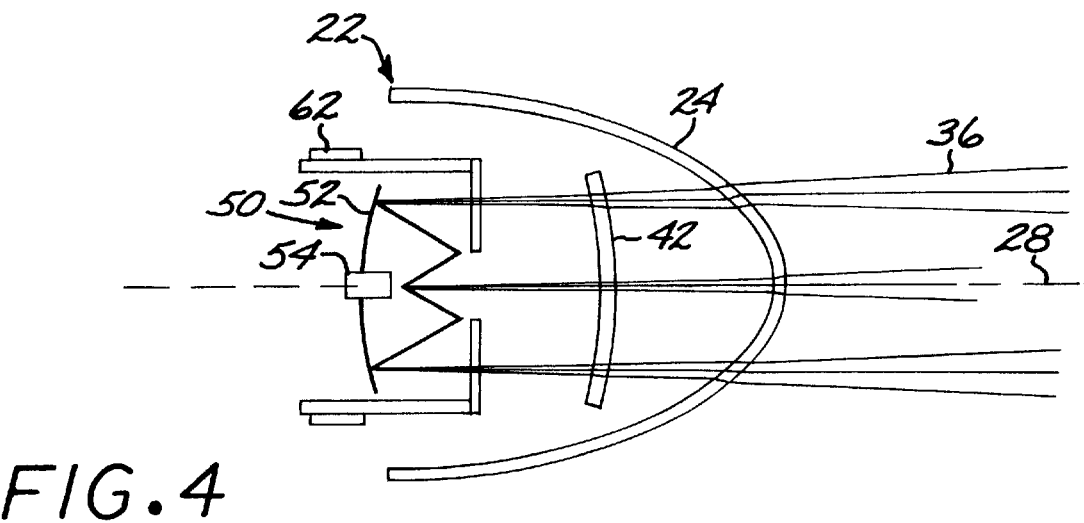
FIG. 4 is a schematic top plan view of the optical system of FIG. 3, with the sensor system pointed along the centerline.
Figure 5:
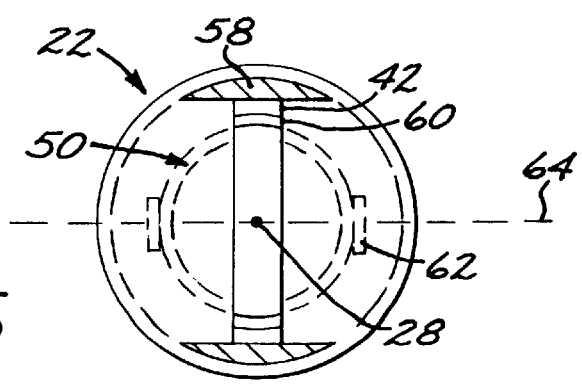
FIG. 5 is a schematic front view of the optical system of FIG. 3, with the sensor system pointed along the centerline.
Figure 6:
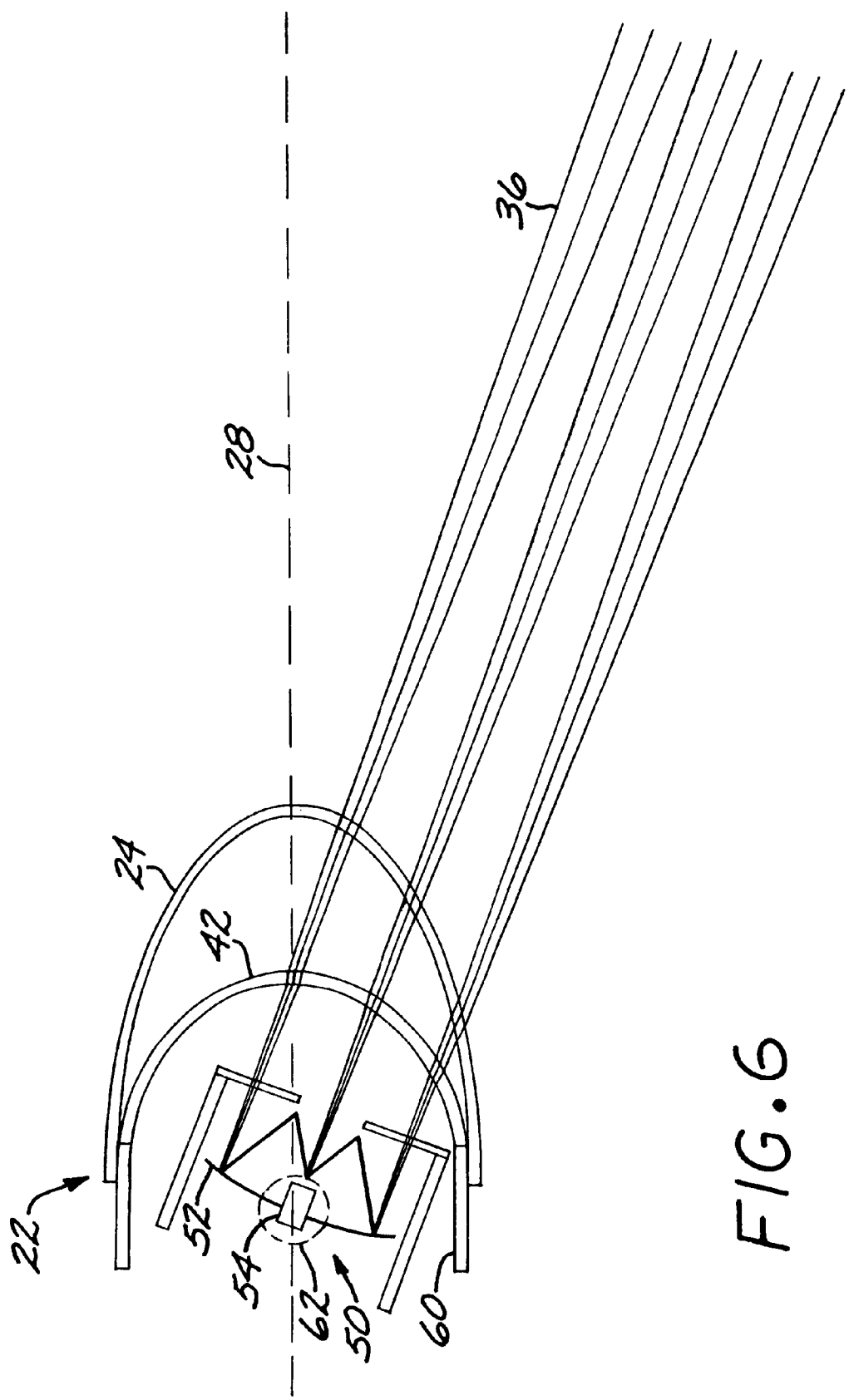
FIG. 6 is a schematic side view of the optical system of FIG. 3, with the sensor system pointed off the centerline.

FIGS. 3–5 provide respectively side, plan, and front views of the optical system as used in the missile 20 (with some elements omitted from particular views for clarity of illustration). The optical corrector 42 is preferably in the form of a curved strip of transparent material having the front surface 44 and back surface 46 as described earlier. In the illustrated embodiment, the optical corrector 42 is mounted on a roll gimbal 58 (including an associated electrical motor drive) that rotates the optical corrector 42 on a track about the centerline 28. With this approach, the strip form of the optical corrector 42 subtends an azimuthal arc as large as necessary to cover the azimuthal field of regard required for the sensor system. The strip optical corrector may be relatively narrow in angular extent in the orthogonal direction, as it is rotated on the roll gimbal 58 to achieve 360 degrees of coverage about the centerline 28. In a typical case, the strip of the optical corrector extends about 40 degrees azimuthally on either side of the centerline 28, and about 3 degrees in angular extent in the orthogonal direction. FIG. 6 is the same view as FIG. 3, but with the sensor system 48 having a look-down azimuthal angle of about 20 degrees.

The sensor system 48 is also preferably mounted on a gimbal, preferably a roll/nod gimbal as illustrated in FIGS. 3–6. The sensor system 48 is mounted on a roll gimbal 60

(including an associated electrical motor drive) that rotates the sensor system 48 about the centerline 28. Within the roll gimbal 60, the sensor system 48 is mounted on a nod gimbal 62 (including an associated electrical motor drive) that rotates the sensor system 48 about a nod axis 64 that lies perpendicular to the centerline 28 of the missile 20. The combination of the roll gimbal 60 and the nod gimbal 62 allows the sensor system 48 to be aimed in an arbitrarily selected direction at any angle up to the maximum field of regard determined by the maximum extent of movement of the nod gimbal 62. The azimuthal angular width of the optical corrector 42 is selected to provide correction up to this maximum field of regard. The optical corrector 42 rotates about the centerline 28 on its roll gimbal 58 in a coordinated movement with the rotation of the sensor system 48 about the centerline 28 on its separate roll gimbal 62, so that the optical path always passes through the optical corrector 42 after it passes through the window 24, and before it reaches the sensor 54.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical system, comprising:
    a window;
    an optical corrector comprising a curved piece of a transparent material having a front surface and a back surface, at least one of the front surface and the back surface having a torus shape defined in Cartesian coordinates by the relation $$Z(x,y)=Z_{prev}(x,y)+L_x(x,y)+L_y(y),$$

wherein $$Z_{prev}(x,y)=c_A\rho^2/[1+(1-(k_A+1)c_A^2\rho^2)^{1/2}]+d_A\rho^4+e_A\rho^6+f_A\rho^8+g_A\rho^{10},$$

$$\rho^2=x^2+y^2,$$

$$L_y(y)=C_1y^2/[1+(1-(C_2+1)C_1^2y^2)^{1/2}]+C_3y^4+C_4y^6+C_5y^8+C_6y^{10}+C_7y^{12}+C_8y^{14},$$

$$L_x(x,y)=C_xx^2/[1+(1-(k_x+1)C_x^2x^2)^{1/2}]+C_{13}x^4+C_{14}x^6+C_{15}x^8+C_{16}x^{10}+C_{17}x^{12}+C_{18}x^{14},$$

$$C_x=C_{11}+C_{21}y+C_{31}y^2,$$

and $$k_xC_{12}+C_{22}y+C_{32}y^2,$$

and wherein $c_A$, $k_A$, $d_A$, $e_A$, $f_A$, $g_A$, $C_1$–$C_8$, $C_{11}$–$C_{18}$, $C_{21}$–$C_{22}$, and $C_{31}$–$C_{32}$ are constants; and
    a sensor system comprising a sensor positioned such that the optical corrector is between the window and the sensor.

2. The optical system of claim 1, wherein the window has an outer surface in a shape of a first generalized conic, and an inner surface in a shape of a second generalized conic.

3. The optical system of claim 1, wherein the window has a fineness ratio of greater than about 0.5.

4. The optical system of claim 1, wherein the sensor is sensitive to ultraviolet energy.

5. The optical system of claim 1, wherein the sensor is sensitive to visible light.

6. The optical system of claim 1, wherein the sensor is sensitive to infrared energy.

7. The optical system of claim 1, wherein the sensor system includes a telescope.

8. The optical system of claim 7, wherein the telescope has a telescope bias aberration to compensate the bias aberration of the optical corrector and of the window.

9. The optical system of claim 1, wherein the optical corrector has a curved strip shape.

10. The optical system of claim 1, wherein the optical corrector is mounted on a roll gimbal.

11. The optical system of claim 1, wherein the sensor system includes a telescope that is mounted on a gimbal.

12. The optical system of claim 1, further including a body of an aircraft to which the window, the optical corrector, and the sensor system are attached.

13. An optical system, comprising:
    a window having a fineness ratio of greater than about 1.0;
    an optical corrector comprising a curved piece of a transparent material having a front surface and a back surface, at least one of the front surface and the back surface having a torus shape defined in Cartesian coordinates by the relation $$Z(x,y)=Z_{prev}(x,y)+L_x(x,y)+L_y(y),$$

wherein $$Z_{prev}(x,y)=c_A\rho^2/[1+(1-(k_A+1)c_A^2\rho^2)^{1/2}]+d_A\rho^4+e_A\rho^6+f_A\rho^8+g_A\rho^{10},$$

$$\rho^2=x^2+y^2,$$

$$L_y(y)=C_1y^2/[1+(1-(C_2+1)C_1^2y^2)^{1/2}]+C_3y^4+C_4y^6+C_5y^8+C_6y^{10}+C_7y^{12}+C_8y^4,$$

$$L_x(x,y)=C_xx^2/[1+(1-(k_x+1)C_x^2x^2)^{1/2}]+C_{13}x^4+C_{14}x^6+C_{15}x^8+C_{16}x^{10}+C_{17}x^{12}+C_{18}x^{14},$$

$$C_x=C_{11}+C_{21}y+C_{31}y^2,$$

and $$k_x=C_{12}+C_{22}y+C_{32}y^2,$$

and wherein $c_A$, $k_A$, $d_A$, $e_A$, $f_A$, $g_A$, $C_1$–$C_8$, $C_{11}$–$C_{18}$, $C_{21}$–$C_{22}$, and $C_{31}$–$C_{32}$ are constants, and wherein the optical corrector has the shape of a curved strip;
    a roll gimbal upon which the optical corrector is supported; and
    a sensor system comprising a sensor positioned such that the optical corrector is between the window and the sensor.

14. The optical system of claim 13, wherein the window has
    an outer surface in a shape of a first generalized conic, and
    an inner surface in a shape of a second generalized conic.

15. The optical system of claim 13, wherein the sensor system includes a telescope that is mounted on a gimbal.

16. An optical system, comprising:
    a window;
    an optical corrector comprising a curved piece of a transparent material having a front surface and a back surface, at least one of the front surface and the back surface having a shape which is a segment of a torus shape; and a sensor system comprising a sensor positioned such that the optical corrector is between the window and the sensor.

17. The optical system of claim 16, wherein the optical corrector has a curved strip shape.

18. The optical system of claim 16, wherein the optical corrector is mounted on a roll gimbal.

19. The optical system of claim 16, further including a body of an aircraft to which the window, the optical corrector, and the sensor system are attached.

20. The optical system of claim 1, wherein the sensor system includes a telescope.

* * * * *